(12) United States Patent
    Guirlinger

(10) Patent No.: US 9,849,899 B1
(45) Date of Patent: Dec. 26, 2017

(54) UTILITY CART

(71) Applicant: Edward G Guirlinger, New Albany, OH (US)

(72) Inventor: Edward G Guirlinger, New Albany, OH (US)

(*) Notice: Subject to any disclaimer, the term of this patent is extended or adjusted under 35 U.S.C. 154(b) by 0 days.

(21) Appl. No.: 14/824,949

(22) Filed: Aug. 12, 2015

Related U.S. Application Data

(62) Division of application No. 13/935,542, filed on Jul. 4, 2013, now Pat. No. 9,457,828.

(51) Int. Cl.
    *B62B 3/02* (2006.01)
    *B62B 3/00* (2006.01)
    *B62B 3/10* (2006.01)

(52) U.S. Cl.
    CPC ............... *B62B 3/005* (2013.01); *B62B 3/02* (2013.01); *B62B 3/106* (2013.01)

(58) Field of Classification Search
    CPC ..................... B62B 3/002–3/005; B62B 3/02
    See application file for complete search history.

(56) References Cited

U.S. PATENT DOCUMENTS

| | | | |
|---|---|---|---|
| 8,011,484 B2 * | 9/2011 | McIntyre | A45C 5/04 190/110 |
| 2012/0161408 A1 * | 6/2012 | Sidhu | A45C 5/14 280/47.38 |

\* cited by examiner

*Primary Examiner* — Erez Gurari
(74) *Attorney, Agent, or Firm* — Lech Law, LLC; Robert R. Lech

(57) ABSTRACT

The utility cart of the present application comprises a frame, at least two wheels and a storage panel. In one embodiment, the storage panel is removable and capable of being replaced with an alternate storage panel.

10 Claims, 13 Drawing Sheets

UTILITY CART

TECHNICAL FIELD

The present application generally relates to devices and methods for storing and transporting collections of items. More specifically, the present application relates to a utility cart having certain advantageous features.

BACKGROUND

Portable utility carts and cabinets are well known for storing and transporting a variety of items, such as audio/video equipment, tool sets and supplies for hotel service employees. Prior art utility carts are typically designed to carry either disparate items or an inflexible predefined set of specific items. A need therefore exists for a utility cart which can be reconfigured as desired to carry a defined set of items. Additionally, a need exists for a cart that securely carries a tool bag while providing visibility of items secured to the tool bag.

SUMMARY

According to a first aspect of the present application, an example utility cart is disclosed. The first example cart comprises: a frame; a plurality of wheels supporting the frame; a storage panel fastener attached to the frame; and a first storage panel comprising a plurality of holders, the first storage panel being moveable between a first position and a second position. The first storage panel may be secured to the storage panel fastener in the first position and the first storage panel may be detached from the storage panel fastener in the second position According to a second aspect of the present application, an example utility cart is disclosed. The second example cart comprises: a frame; a plurality of wheels supporting the frame; a handle attached to the frame; a tool bag basket attached to the handle; and a tool bag disposed within and supported by the basket. The tool bag comprises at least one holder disposed along the exterior surface of the tool bag, and the holder is for securing an item to the tool bag. The basket is contoured to mate with the tool bag, and the basket comprises a plurality of support members for supporting the tool bag. The plurality of support members are spaced apart to enable at least a portion of the item to be visible when the tool bag is disposed within the basket According to a third aspect of the present application, an example utility cart is disclosed. The third example cart comprises: a frame comprising a door compartment base, a door compartment top retainer and a door compartment side retainer; a plurality of wheels supporting the frame; and a door compartment hingedly attached to the frame. The door compartment comprises a door front, a door top, and at least one door side. The door top is attached to the door front, and the door top being movable between a first position wherein the door top engages the door compartment top retainer, and a second position wherein the door top does not engage the door compartment top retainer. The door front is moveable between a closed position in which the door side engages the door compartment side retainer and an open position in which the door compartment side does not engage the door compartment side retainer.

According to a fourth aspect of the present application, an example utility cart is disclosed. The fourth example cart comprises: a frame; a plurality of wheels supporting the frame; a work surface supported by the frame; at least one fixed side wall attached to the frame; and at least one moveable side wall attached to the frame. The at least one fixed side wall and the at least one moveable side wall at least partially surround the work surface to prevent items from dropping off the work surface.

According to a fifth aspect of the present application, an example tool bag is disclosed. The example tool bag comprises: a frame; a flexible covering comprising at least a portion of an outer surface of the tool bag; and a tool holder, the tool holder being hingedly attached to the frame. The tool holder is movable between a first position in which lateral profile of the tool holder is reduced, and a second position in which the lateral profile of the tool holder is enlarged. The tool holder is configured to receive a handle of a tool when in the second position.

According to a sixth aspect of the present application, an example vice is disclosed. The example vice comprises: a base and a jaw. The base comprises a horizontally disposed work surface, and the base defines an indexing void for receiving an indexing element. The jaw comprises a horizontally disposed gripping surface, and the jaw is vertically movable to and from the work surface. The jaw is hinged such that the jaw may be rotated between a first position in which the gripping surface is directly above the work surface and a second position in which at least a portion of the gripping surface is not disposed directly above the work surface. The jaw further comprises an indexing element that mates with the indexing void when the gripping surface is in close proximity to the work surface and the jaw is in the first position.

BRIEF DESCRIPTION OF THE DRAWINGS

The accompanying figures, which are incorporated in and constitute a part of the specification, illustrate various example apparatuses, systems, methods, and so on, and are used merely to illustrate various example embodiments. It should be noted that various components depicted in the figures may not be drawn to scale, and that the various assemblies and designs depicted in the figures are presented for purposes of illustration only, and should not be considered in any way as limiting.

DRAWING REFERENCE NUMERALS

Figure 1:
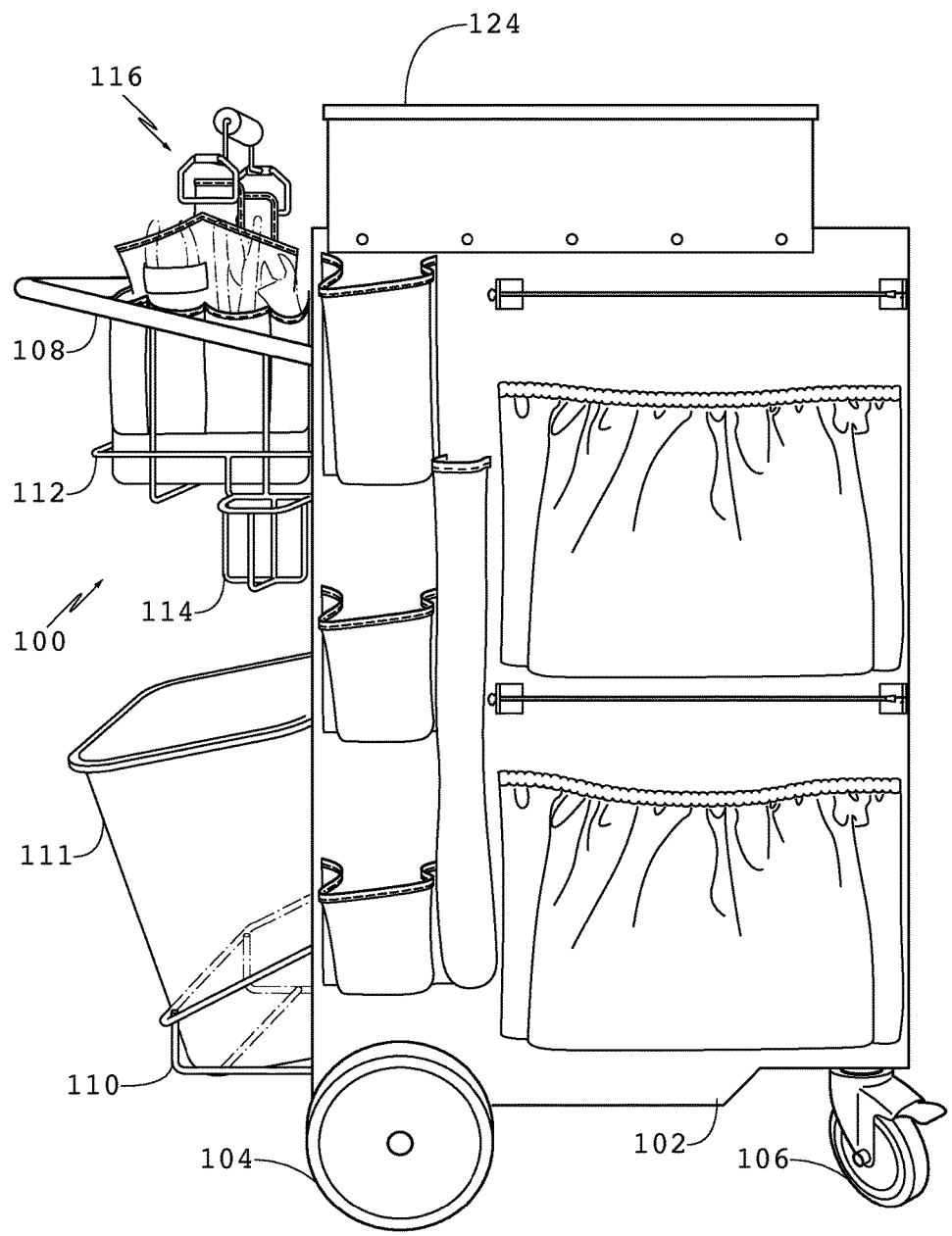
FIG. 1 illustrates a right side view of an example utility cart.

The following reference characters identify the associated elements depicted in the drawings describing the present invention:
100 Cart
102 Frame
104 Rear Wheel
106 Front Wheel
108 Handle
110 Wastebasket Retainer
112 Basket
114 Drink Holder
116 Tool Bag
118 Door
119 Door Side Retainer
120 Door Top
122 Work Surface
124 Fixed Side Wall
126 Hinged Side Wall
128 Vice
130 Drawer
132 Bi-level Bottom
134 Door Front
136 Door Side
138 Door Top
140 Ladder Hanger
142 Removable Storage Panel
144 Removable Storage Panel
146 Holder
147 Elongated Void
148 Cover
150 Tool Holder
152 Lock

DETAILED DESCRIPTION

Figure 2:
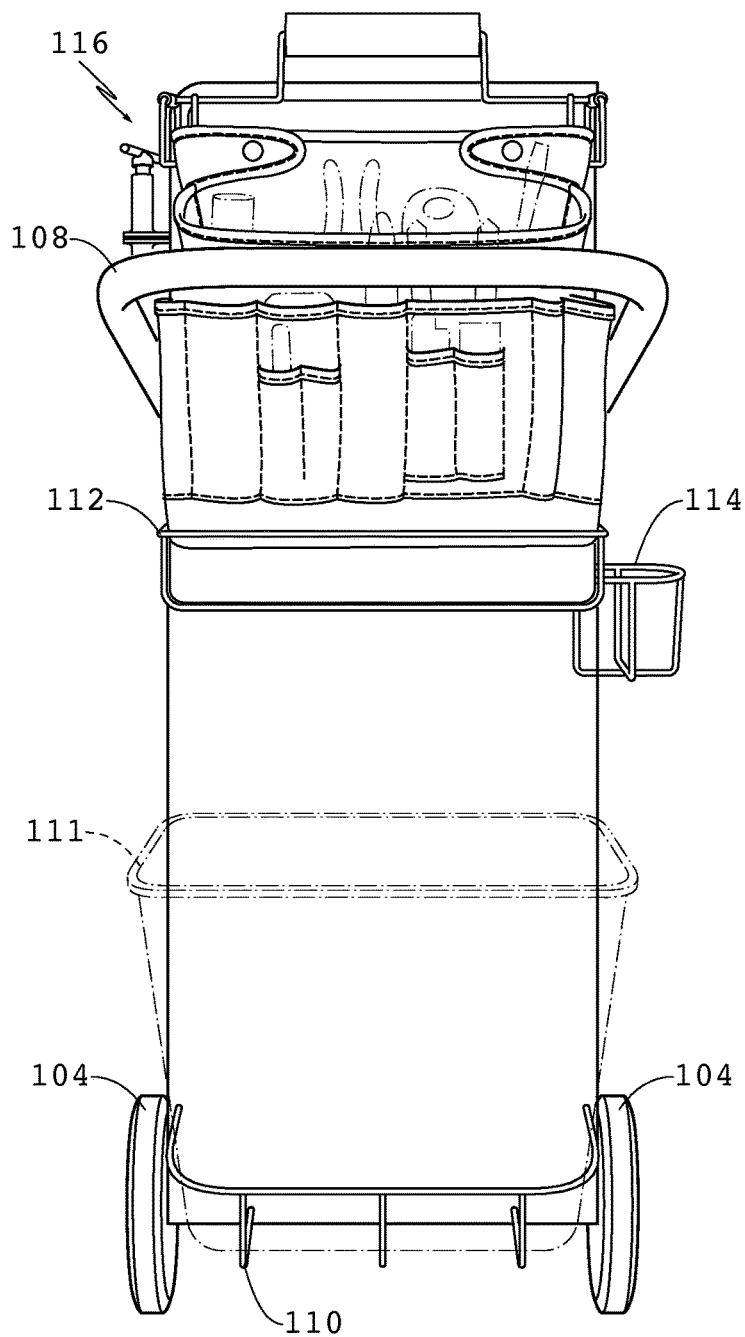
FIG. 2 illustrates a rear view of the example utility cart of FIG. 1.

FIGS. 1-14 illustrate various aspects of an example utility cart 100. As shown in FIGS. 1 and 2, cart 100 comprises a frame 102, at least one rear wheel 104, at least one front wheel 106, a handle 108, a wastebasket retainer 110, removable wastebasket 111, a tool bag retainer or basket 112, a drink holder 114, and a removable tool bag 116.

Figure 3:
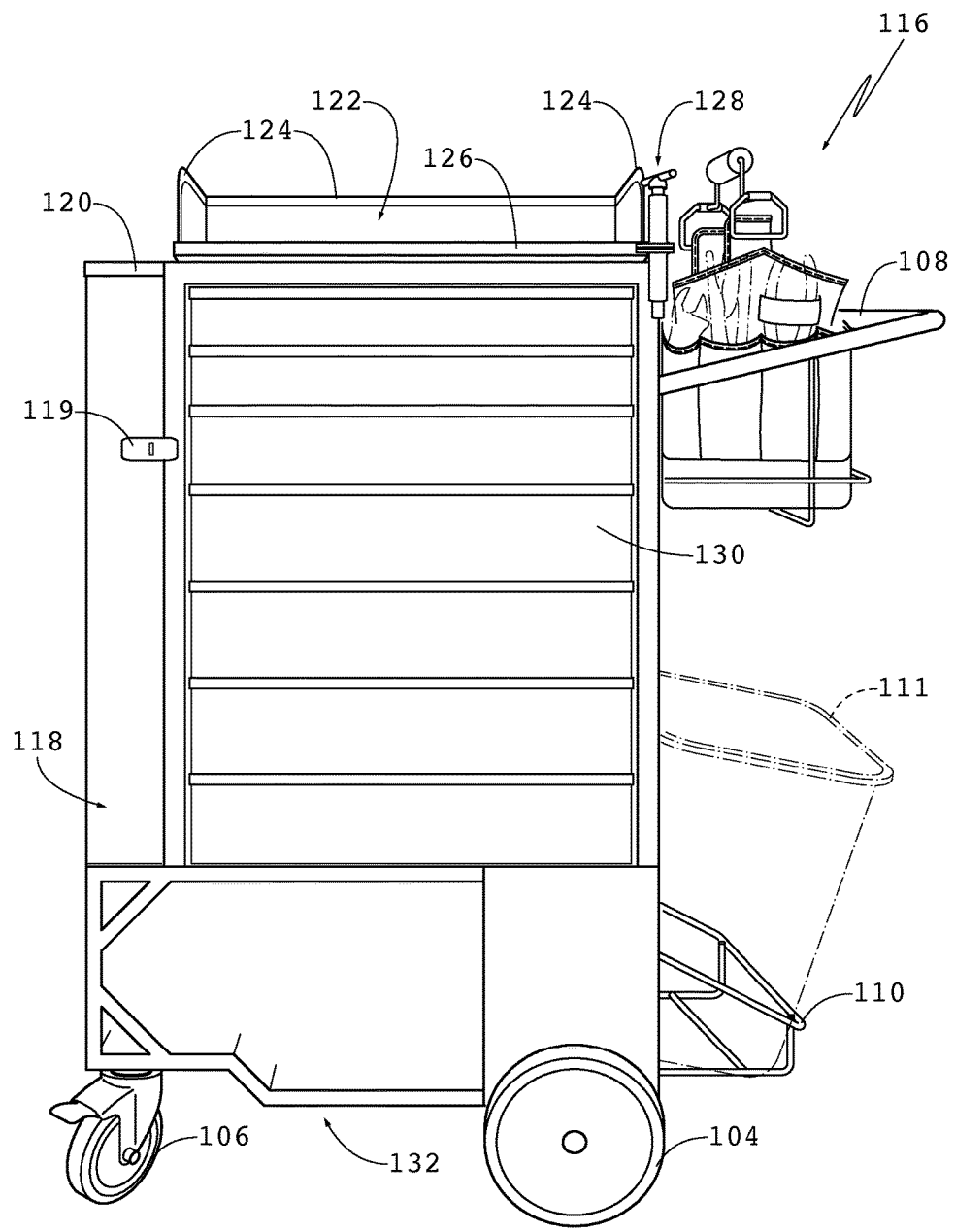
FIG. 3 illustrates a left side view of the example utility cart of FIG. 1.

A left side view of cart 100 is shown in FIG. 3. As shown, cart 100 further comprises a door 118 which cooperates with door side retainer 119 and door top 120. Cart 100 also comprises a work surface 122 surrounded by fixed side walls 124 and hinged side wall 126. As shown, hinged side wall 126 is disposed in an open or down position. Cart 100 comprises a vice 128, plurality of drawers 130, and a bi-level bottom 132 which accommodates differently sized front wheels 106 and rear wheels 104.

Figure 4:
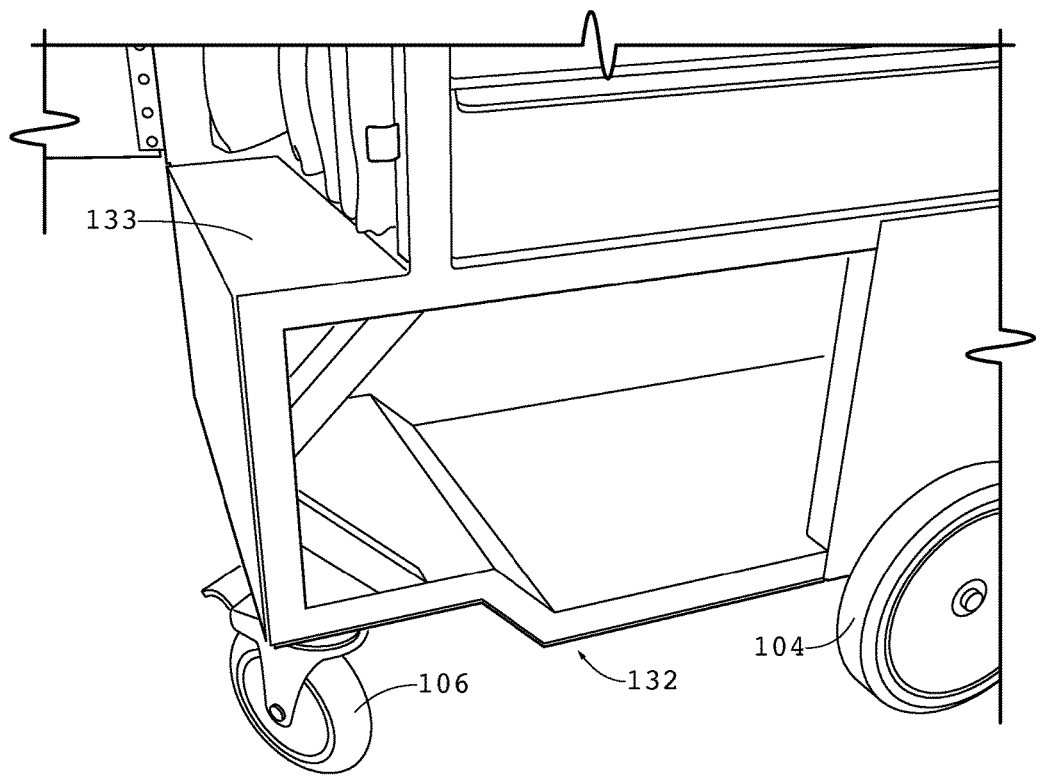
FIG. 4 illustrates the storage compartment of the example utility cart of FIG. 1.

The bi-level bottom 132 is more clearly shown in FIG. 4. FIG. 4 further illustrates door compartment base 133 which defines the bottom of the door compartment when the door is disposed in a closed position.

Figure 5:
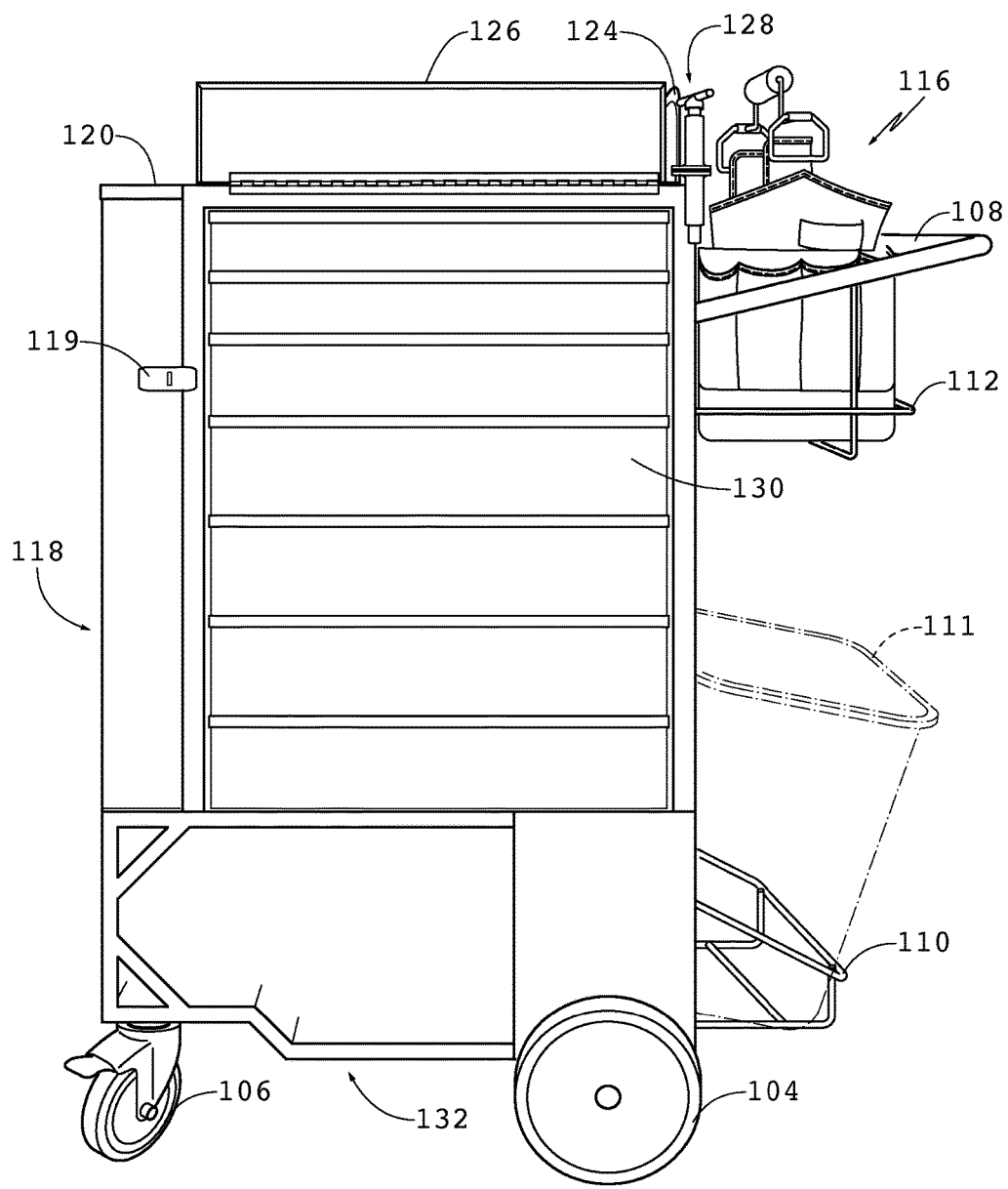
FIG. 5 illustrates a left side view of the example utility cart of FIG. 1.
Figure 6:
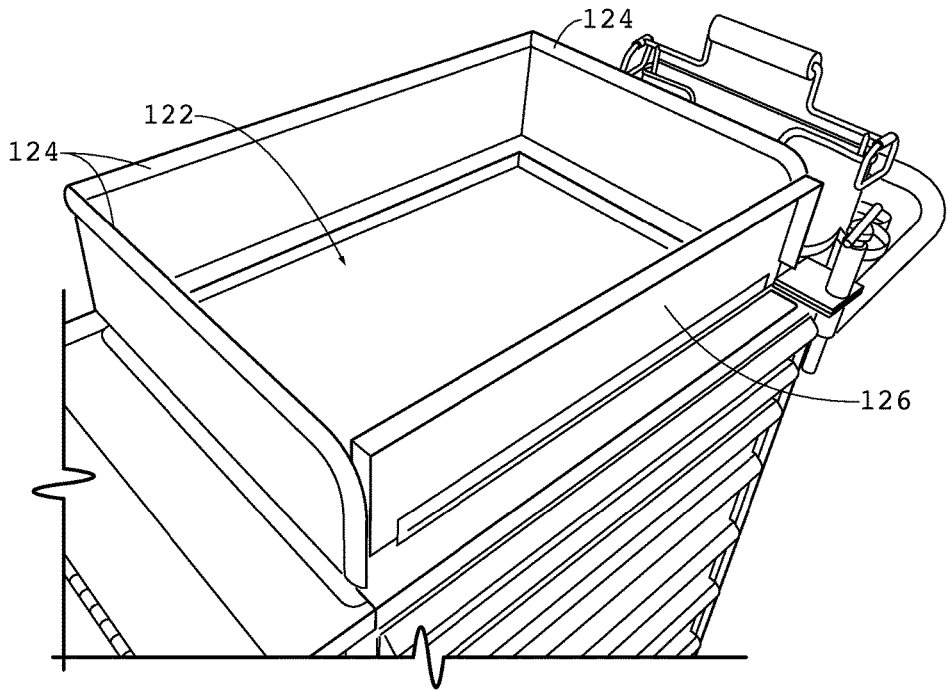
FIG. 6 illustrates a top perspective view of the example utility cart of FIG. 1.
Figure 7:
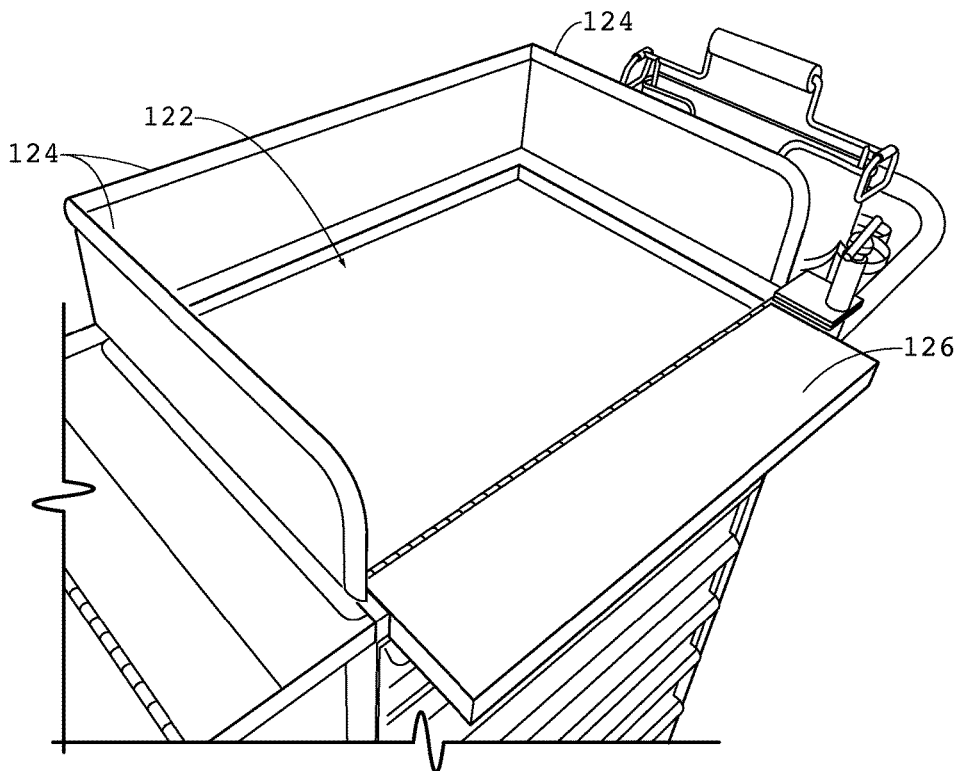
FIG. 7 illustrates a top perspective view of the example utility cart of FIG. 1.

Another left side view of cart 100 is shown in FIG. 5 wherein the hinged side wall 126 is disposed in a closed or up position. When the hinged side wall 126 is in the closed position, as shown more clearly in FIG. 6, items on work surface 122 are retained within the work surface. When the hinged side wall 126 is in the open position, as shown more clearly in FIG. 7, items on work surface 122 are not so retained, and the hinged side wall 126 may function as an extension of the work surface 122.

Figure 8:
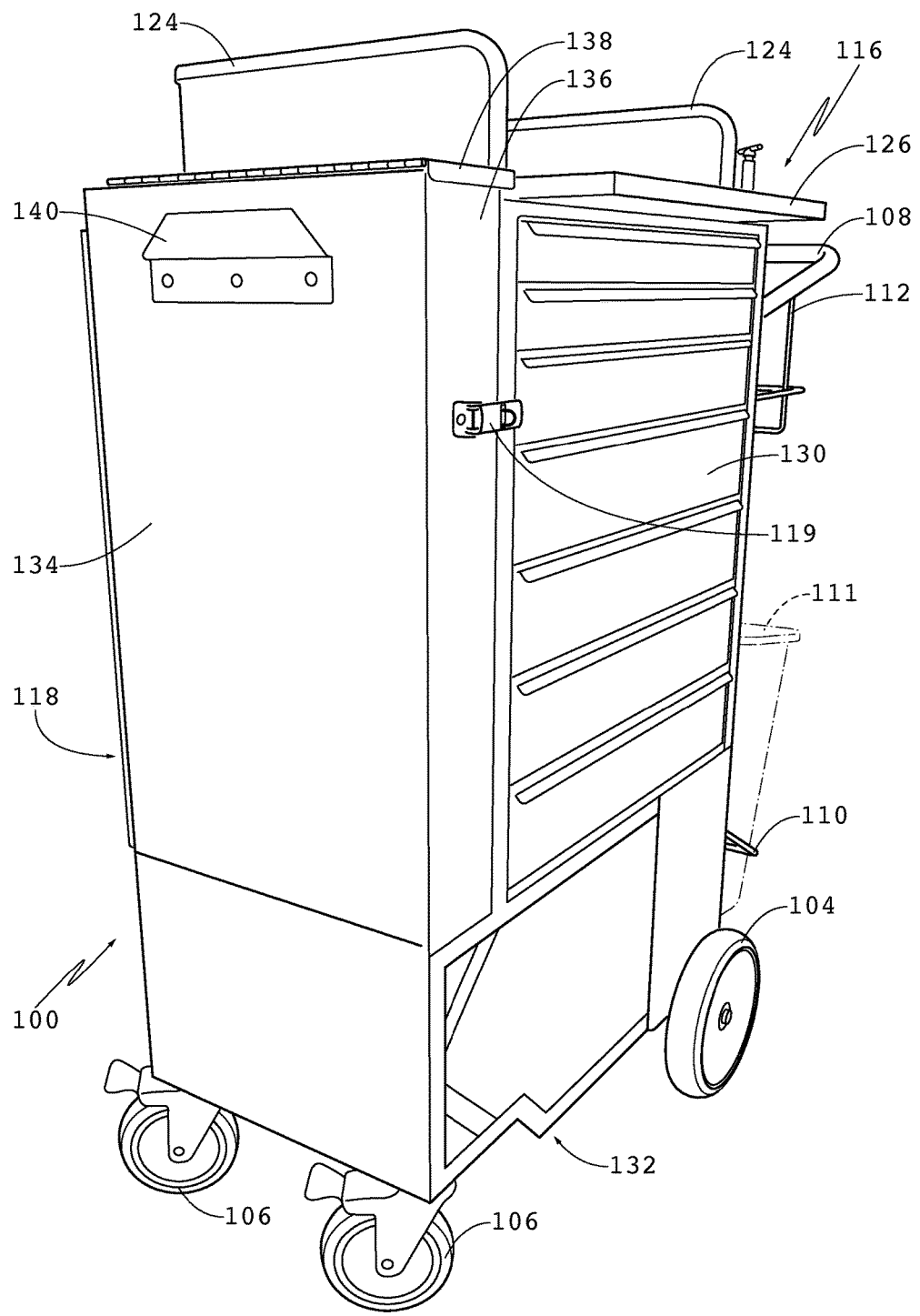
FIG. 8 illustrates a front left perspective view of the example utility cart of FIG. 1.

A front left perspective view of cart 100 is shown in FIG. 8. As shown, cart 100 is configured such that door 118 is disposed in a closed position. Door 118 comprises door front 134, a door side 136, and a door top 138. Ladder hanger 140 is shown attached to door front 134.

Figure 9:
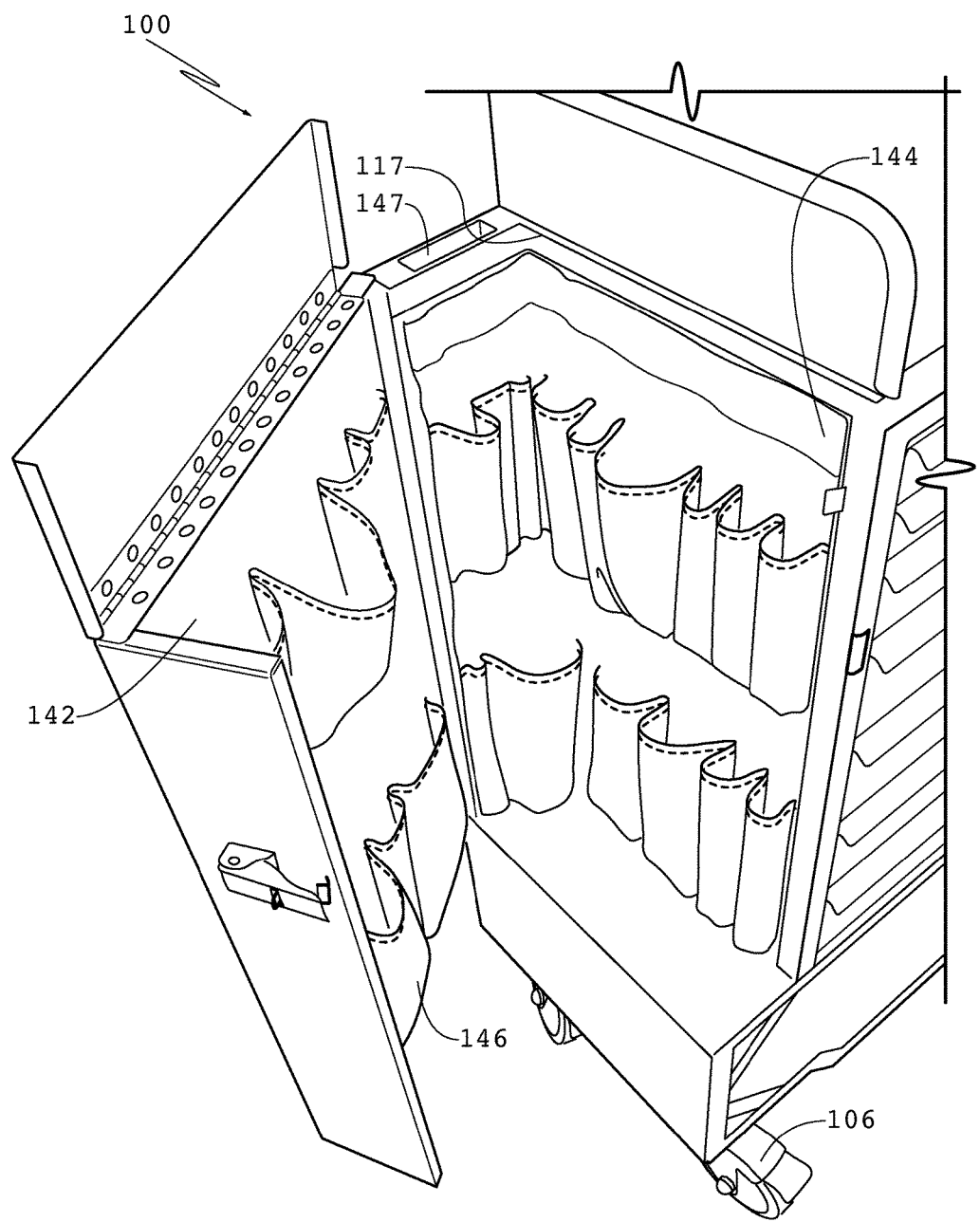
FIG. 9 illustrates a front left perspective view of the example utility cart of FIG. 1.

Another front left perspective view of cart 100 is shown in FIG. 9. In FIG. 9, cart 100 is configured such that door 118 is disposed in an open position. As illustrated with door 118 in the open position, door top retainer 117 is visible. Removable storage panels 142 and 144 are disposed on the interior of door 118 and on cart 100, respectively. Storage panels 142 and 144 may be secured to cart 100 using storage panel fasteners (not shown). In the illustrated example embodiment, the storage panel fasteners are hook and loop style fasteners, commonly referred to as Velcro. Of course, one having ordinary skill in the art will recognize numerous alternate embodiments for storage panel fasteners.

The storage panels 142 and 144 may be detached from the cart 100 and replaced with a substitute or alternate tool panel. This allows the cart 100 to be customized for specific applications, such as may be required by electrical contractors, hotel maintenance employees, computer repair personnel and plumbers, for example. Each storage panel may comprise holders, such as holder 146, for retaining desired items within cart 100.

Figure 10:
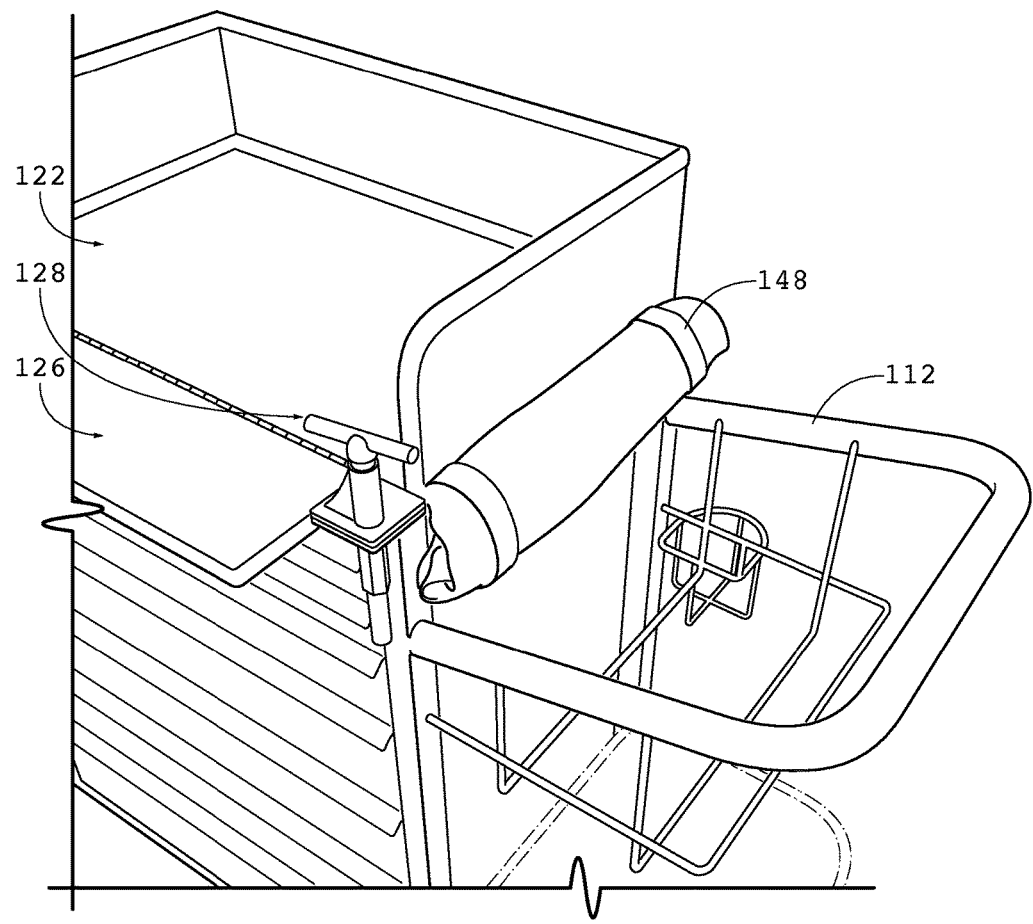
FIG. 10 illustrates a top left rear perspective view of the example utility cart of FIG. 1.

Referring now to FIG. 10, a rear perspective view of cart 100 is presented. As shown in FIG. 10, cart 100 is configured with hinged side wall 126 disposed in an open position such that it provides an extension for work surface 122. Further tool bag 116 has been removed from cart 100 providing a view of cover 148 and a more complete view of basket 112. Vice 128 is also illustrated in its closed configuration.

Figure 11:
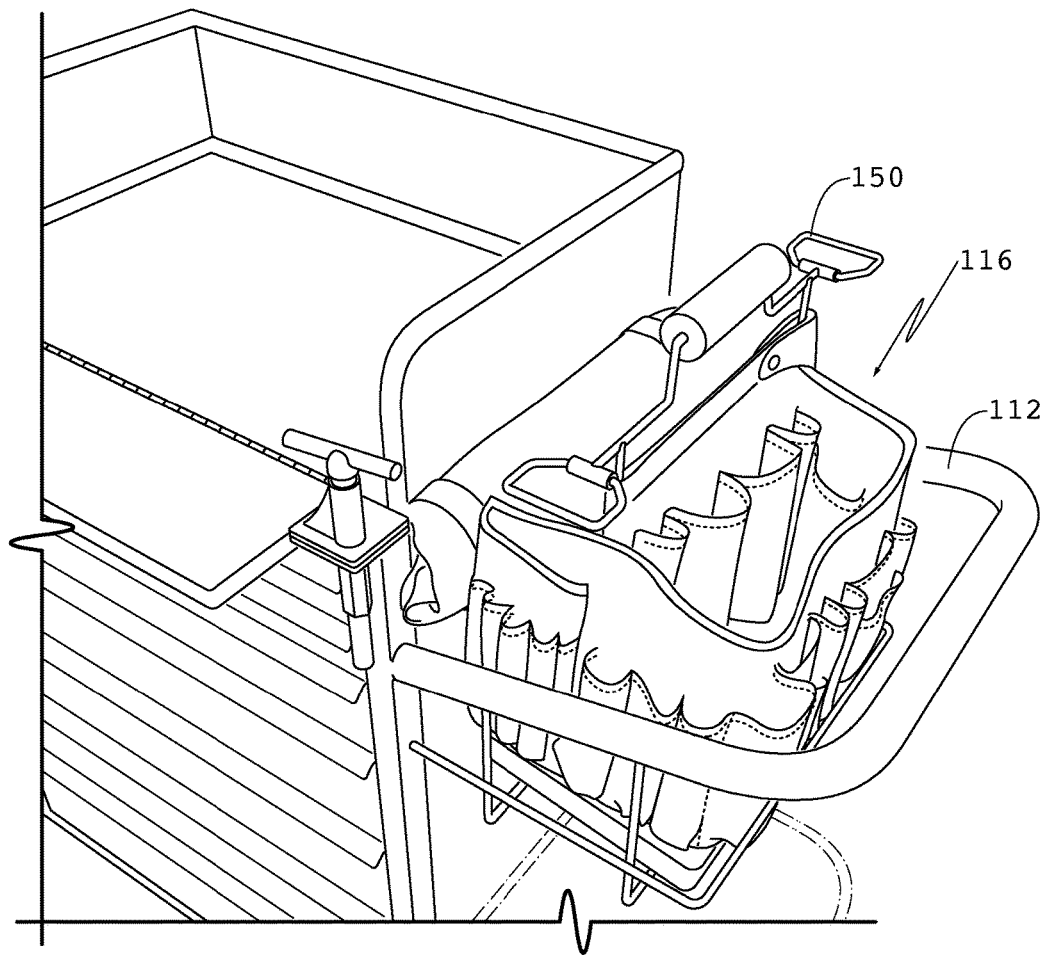
FIG. 11 illustrates a top left rear perspective view of the example utility cart of FIG. 1.

FIG. 11 provides another rear perspective view of cart 100 wherein tool bag 116 is disposed within basket 112. As shown, tool bag 116 comprises a frame, a flexible covering comprising at least a portion of an outer surface of the tool bag, and a tool holder 150. The tool holder 150 is hingedly attached to the frame, and the tool holder 150 is movable between a first position in which tool holder 150 may be folded downward, thereby reducing the lateral profile of the tool holder 150 (not shown), and a second position in which the lateral profile of the tool holder 150 is enlarged, as shown in FIG. 11. In the second position, the tool holder 150 is configured to receive a handle of a tool.

Figure 12:
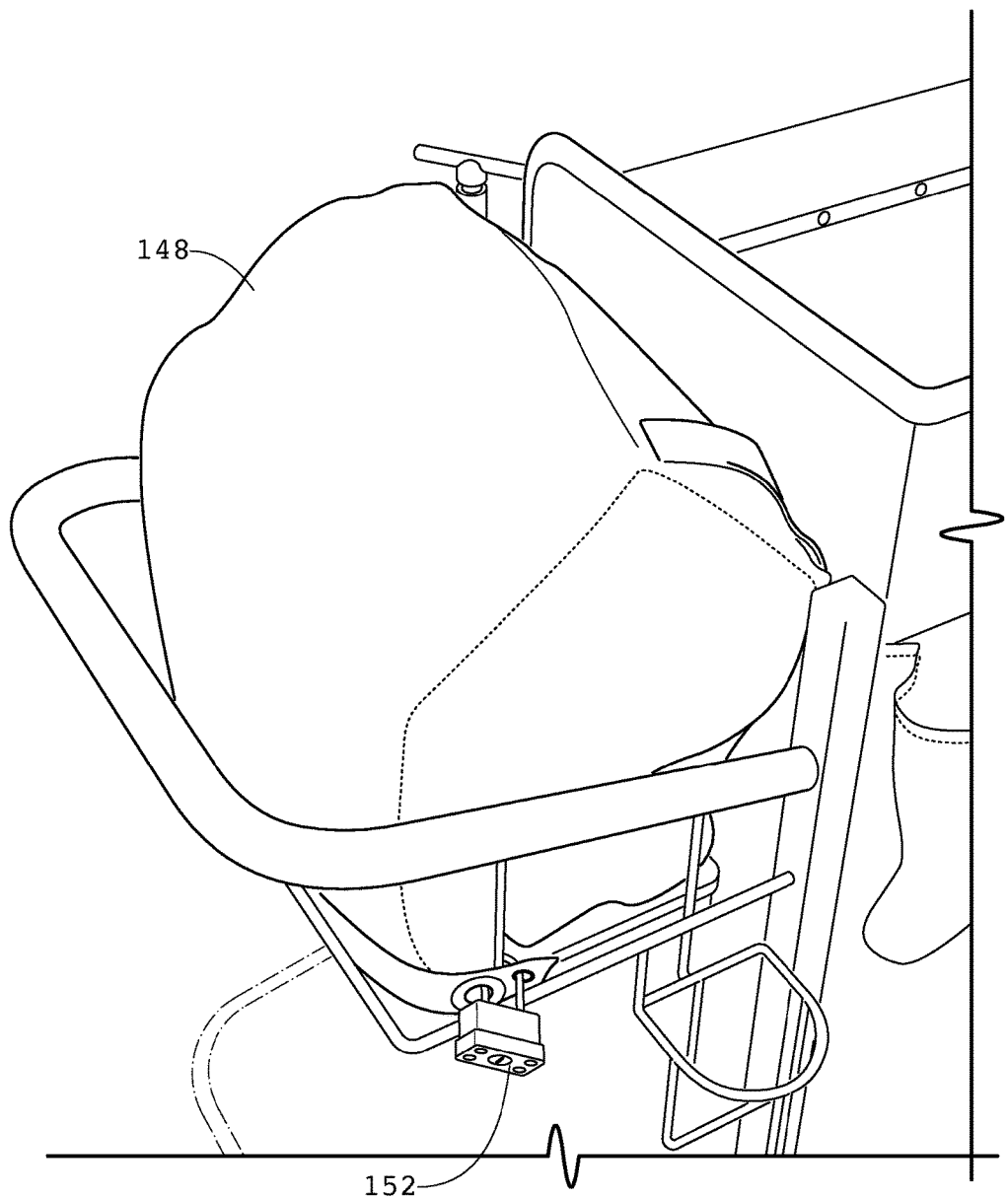
FIG. 12 illustrates a top right rear perspective view of the example utility cart of FIG. 1.

FIG. 12 provides an upper right rear perspective view of cart 100 wherein the tool bag 116 is covered by cover 148. As illustrated, cover 148 may be locked using a standard lock 152

Figure 13:
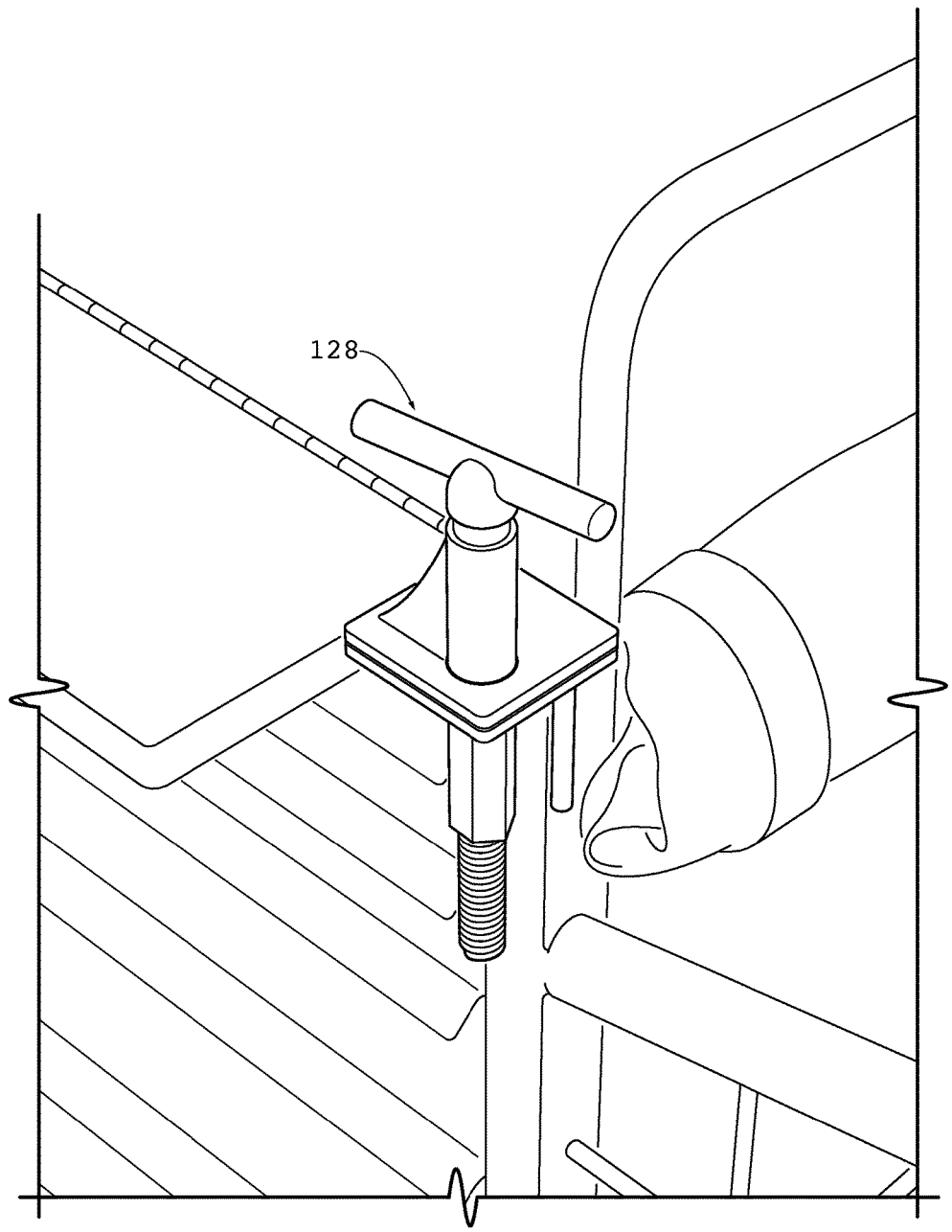
FIG. 13 illustrates a magnified perspective view of vice in closed position.
Figure 14:
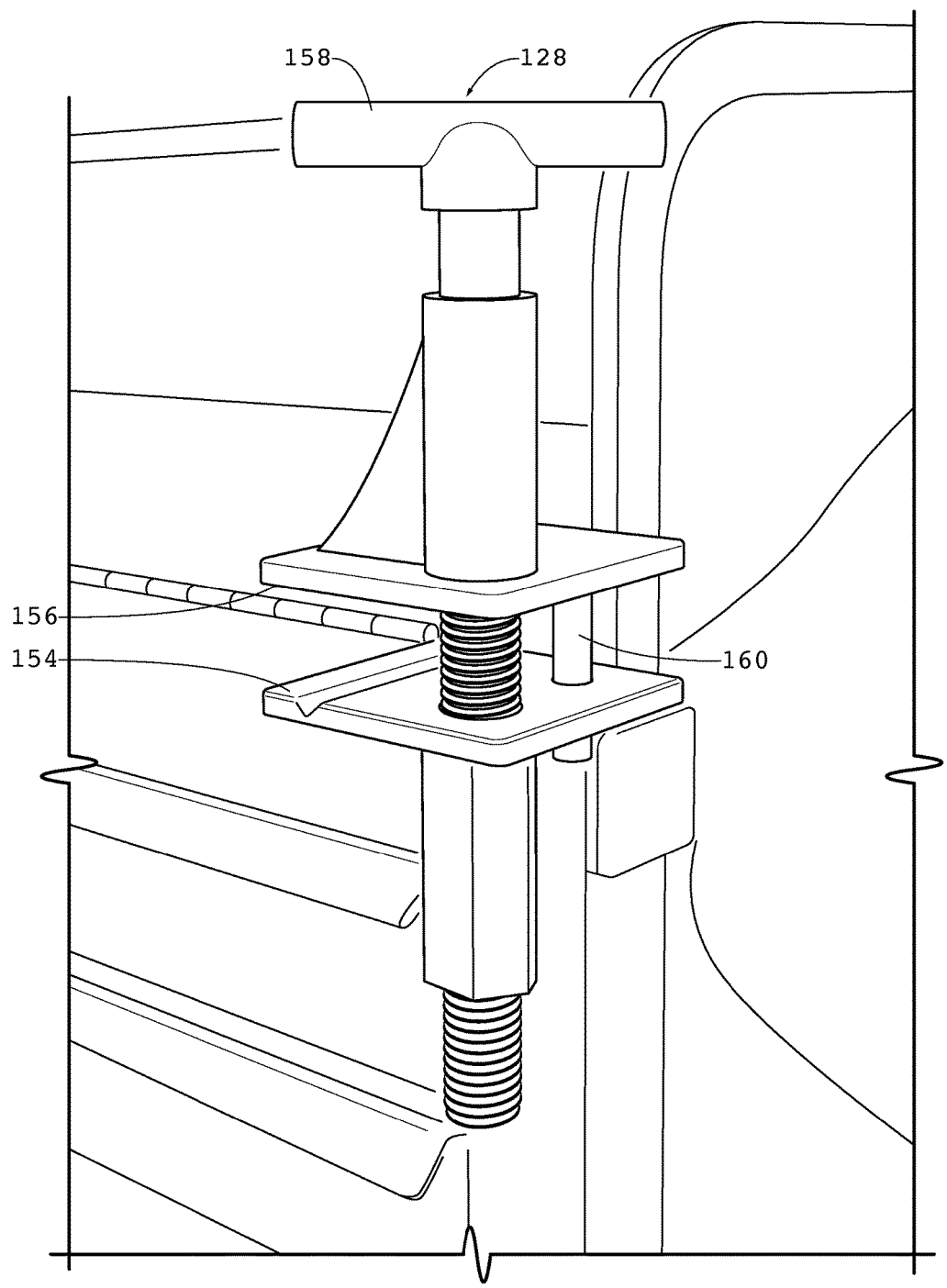
FIG. 14 illustrates a magnified perspective view of vice in open position.

FIG. 13 provides a magnified perspective view of vice 128 in a closed position. FIG. 14 provides a magnified perspective view of vice 128 in an open position. As illustrated, vice 128 is a compact and lightweight tool. Vice 128 comprises a base 154 comprising a horizontal work surface, and a jaw 156 comprising a gripping surface. Jaw 156 cooperates with mechanism 158 to enable movement of the jaw 156 between an open and closed position thereby retaining a work piece between the work surface and the gripping surface.

Jaw 156 further comprises an indexing element 160 which mates with an indexing void defined by base 154 so as to properly orient the jaw 156 with respect to the base 154. When jaw 156 is opened beyond the depth of the indexing element 160, the orientation of jaw 156 is no longer fixed, allowing jaw 156 to be swiveled or rotated away from the work surface to enable the work surface of base 154 to be used without obstruction.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A cart comprising:
   a frame;
   a handle comprising an integrated basket;
   a plurality of wheels supporting the frame;
   a door hingedly attached to the frame, the door being movable between an open and a closed position, the door cooperating with at least a portion of the frame to define a storage compartment when the door is in the closed position;
   a first removable storage panel affixed to the door and disposed within the storage compartment when the door is in the closed position, the first storage panel comprising a plurality of tool holders; and
   a second removable storage panel affixed to the frame and disposed within the storage compartment when the door is in the closed position, the second storage panel comprising a plurality of tool holders.

2. The cart of claim 1 wherein the frame defines an elongated vertical void for storing an elongated item.

3. The cart of claim 1 wherein the frame comprises a bi-level base for accommodating wheels of different sizes.

4. The cart of claim 1 wherein the cart further comprises a basket cover.

5. The cart of claim 1 wherein the frame comprises a hinged side wall and a vice disposed adjacent to the hinged side wall.

6. A cart comprising:
   a frame, the frame comprising a handle comprising an integrated basket, the frame further comprising a hinged side wall and a vice disposed adjacent to the hinged side wall;
   a plurality of wheels supporting the frame;
   a door hingedly attached to the frame, the door being movable between an open and a closed position, the door cooperating with at least a portion of the frame to define a storage compartment when the door is in the closed position;
   a first removable storage panel affixed to the door and disposed within the storage compartment when the door is in the closed position, the first storage panel comprising a plurality of tool holders; and
   a second removable storage panel affixed to the frame and disposed within the storage compartment when the door is in the closed position, the second storage panel comprising a plurality of tool holders.

7. The cart of claim 6 further comprising a basket cover.

8. The cart of claim 6 wherein the frame defines an elongated vertical void for storing an elongated item.

9. The cart of claim 6 wherein the frame comprises a bi-level base for accommodating wheels of different sizes.

10. A cart comprising:
    a frame, the frame comprising a bi-level base for accommodating wheels of different sizes, a handle comprising an integrated basket, a hinged side wall and a vice disposed adjacent to the hinged side wall;
    a plurality of wheels supporting the frame;
    a door hingedly attached to the frame, the door being movable between an open and a closed position, the door cooperating with at least a portion of the frame to define a storage compartment when the door is in the closed position;
    a first removable storage panel affixed to the door and disposed within the storage compartment when the door is in the closed position, the first storage panel comprising a plurality of tool holders; and
    a second removable storage panel affixed to the frame and disposed within the storage compartment when the door is in the closed position, the second storage panel comprising a plurality of tool holders.

* * * * *